United States Patent [19]

Lien

[11] Patent Number: 4,721,079
[45] Date of Patent: Jan. 26, 1988

[54] ROTARY ENGINE

[76] Inventor: Orphey A. Lien, P.O. Box 666, North Star Rte., Poplar, Mont. 59255

[21] Appl. No.: 907,580

[22] Filed: Sep. 15, 1986

[51] Int. Cl.⁴ .............................................. F02B 53/00
[52] U.S. Cl. ....................................... 123/241; 418/68
[58] Field of Search ................... 123/241, 243, 245; 418/68, 193, 231

[56] References Cited

U.S. PATENT DOCUMENTS

| | | |
|---|---|---|
| 769,082 | 8/1909 | Hendricks . |
| 1,094,790 | 4/1914 | Jahn ..................... 123/245 |
| 1,379,653 | 5/1921 | Shoemaker . |
| 1,974,761 | 9/1934 | Vogel ..................... 123/243 |
| 2,101,428 | 12/1937 | Cuny . |
| 2,482,325 | 9/1949 | Davis ..................... 418/193 X |
| 2,621,852 | 12/1952 | Pisa ........................... 418/68 |
| 2,622,569 | 12/1952 | Rochefort ............... 123/243 X |
| 2,828,695 | 4/1958 | Marshall ................. 418/193 X |
| 3,277,792 | 10/1966 | Stenerson ..................... 418/193 |
| 3,301,233 | 1/1967 | Dotto et al. .............. 123/243 |
| 3,528,242 | 9/1970 | Hartmann ................ 418/193 X |
| 3,549,286 | 12/1970 | Moriarty ................. 418/193 X |
| 3,847,515 | 11/1974 | Caldwell .................. 418/193 X |
| 3,915,601 | 10/1975 | Keplinger et al. .......... 418/193 X |
| 3,970,051 | 7/1976 | Kirkman ................. 123/243 X |

FOREIGN PATENT DOCUMENTS

| | | |
|---|---|---|
| 687022 | 1/1940 | Fed. Rep. of Germany ...... 123/241 |
| 826331 | 12/1951 | Fed. Rep. of Germany . |
| 511943 | 2/1918 | France ...................... 418/193 |

*Primary Examiner*—Michael Koczo
*Attorney, Agent, or Firm*—Merchant, Gould, Smith, Edell, Welter & Schmidt

[57] ABSTRACT

The present rotary engine has a frame with facing, endless spherical surfaces between which combustion chambers move through contraction and expansion cycles. Rotors forming opposite sides of the combustion chambers rotate on an angled, nonrotatable shaft through which a straight power shaft passes. Ring gears on the hubs of the rotors drive gears fastened to the power shaft. The engine is air cooled with air deflected into an interior chamber for subsequent use as combustion air. Air is also deflected into hollow wall segments forming opposite sides of the combustion chambers and into hollow cross vanes forming the other opposite sides of the combustion chambers. The wall segments and cross vanes include sealing mechanisms. The present engine is simple in design and provides a high power to weight ratio.

20 Claims, 9 Drawing Figures

ROTARY ENGINE

FIELD OF THE INVENTION

The present invention is directed to the field of rotary engines.

BACKGROUND OF THE INVENTION

Rotary engines are known and have attained a degree of notoriety in recent years. Known engines, however, are complex, especially with respect to driving the power shaft. That is, it is common to have a segmented shaft connected together in some fashion near the center of rotation or to have various hollow passageways through the shaft.

In addition, known engines use a wobbling rotor or other complex rotor means, often segmented.

Also, a feature which tends to severely complicate known engines is the passageway system or other mechanism for directing air and fuel into the combustion chambers and exhausting combustion products.

The present invention achieves a simplicity in geometry, while providing for all the necessary functions. Furthermore, the present engine results in more power per unit weight, which is especially significant considering the simplicity of the design.

SUMMARY OF THE INVENTION

The present invention is directed to an engine which includes a frame including an enclosed air chamber, a plurality of variably expanding and contracting combustion chambers, and mechanism for supporting the combustion chambers from the frame. The supporting mechanism includes mechanism for rotating the combustion chambers about the air chamber so that each of the combution chambers travels through an endless series of compression and expansion cycles. The engine further includes a solid power shaft and mechanism for rotatably mounting the power shaft with respect to the supporting mechanism so that the power shaft extends through the air chamber. The combustion chambers rotating mechanism includes a mechanism for driving the power shaft. The engine also includes a mechanism for charging the combustion chambers with air and a mechanism for charging the combustion chambers with fuel to create an air-fuel mixture. In addition, the engine has a mechanism for selectively igniting the air-fuel mixture in each of the combustion chambers near the end of the compression cycle to create pressurized combustion products and a mechanism for exhausting the combustion products from each of the combustion chambers near the end of the expansion cycle. Also, there is a mechanism for cooling the engine.

In a preferred embodiment, the frame includes members which form portions of inner and outer concentric spherical surfaces and a hollow, nonrotatable, angled shaft with radial walls extending from each leg of the shaft to the member forming the inner spherical surface. In this way, an air chamber is formed between the nonrotatable shaft and the member forming the inner spherical surface, as well as between the radial walls. The power shaft is straight and solid and extends directly through the angled, nonrotatable shaft. Combustion chambers are formed between the inner and outer spherical surfaces by rotors on either side of the radial walls of the air chamber and cross vanes extending between the rotors and between the inner and outer spherical surfaces. Air for cooling the interior of the engine and also for charging the combustion chambers is directed through openings in the rotors and radial walls to the central air chamber. For charging the combustion chambers, there are openings in the member forming the inner spherical surface. Openings in the outer spherical surface provide for exhaust. Additional cooling is provided by flow paths for air through the annular thickened walls of the rotors, as well as through the cross vanes.

The present engine is particularly advantageous because it achieves a high power to weight ratio, while maintaining a simplicity in design and consequent minimum of parts and cost. Of particular importance is the solid, straight power shaft within the hollow, angled, nonrotatable shaft, as well as the system for both cooling the interior of the engine and charging, even supercharging, the combustion chambers.

These advantages are more fully explained and can be better understood by reference to the drawings, briefly described hereinafter, and the detailed description of the preferred embodiment thereafter.

DETAILED DESCRIPTION OF THE PREFERRED EMBODIMENT

Figure 1:
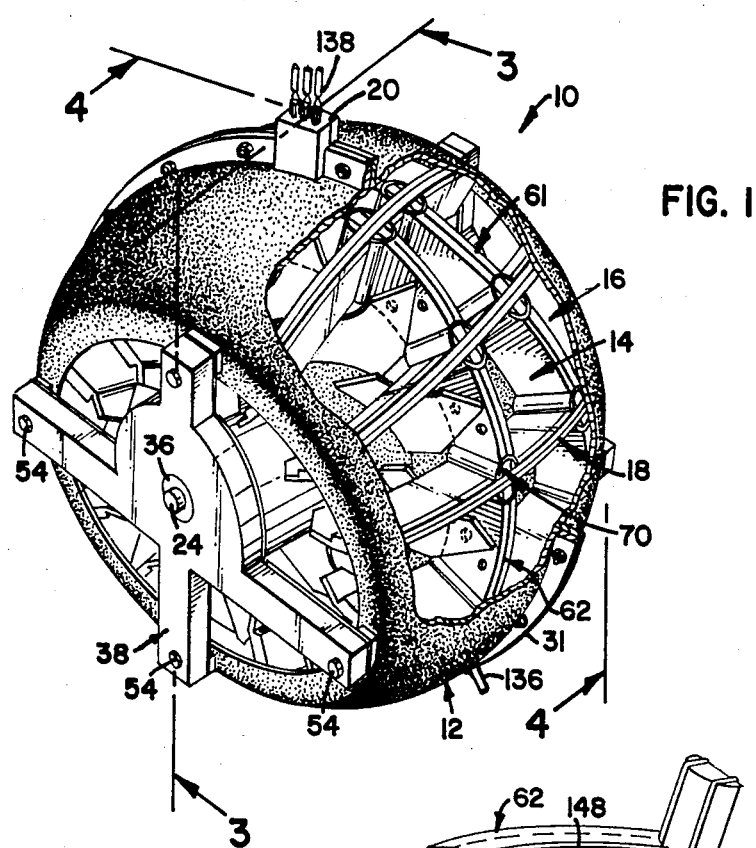
FIG. 1 is a perspective view of an engine in accordance with the present invention with a portion of the outer frame members removed for clarity.

Referring now to the drawings wherein like reference numerals designate identical or corresponding parts throughout the several views, and more particularly to FIG. 1, an engine in accordance with the present invention is designated generally by the numeral 10. Engine 10 includes a frame 12 within which a plurality of combustion chambers 14 move through contraction and expansion cycles. The combustion chambers have sidewalls formed by a pair of rotors 16 with cross vanes 18 extending therebetween. Spark plugs or another conventional ignition mechanism 20 provide for igniting an air-fuel mixture which creates pressurized combustion products which force the combustion chambers 14 to expand and move rotors 16 in rotation about a hollow, nonrotatable shaft 22 (see FIG. 3) and to drive power shaft 24 which extends through nonrotatable shaft 22.

Figure 3:
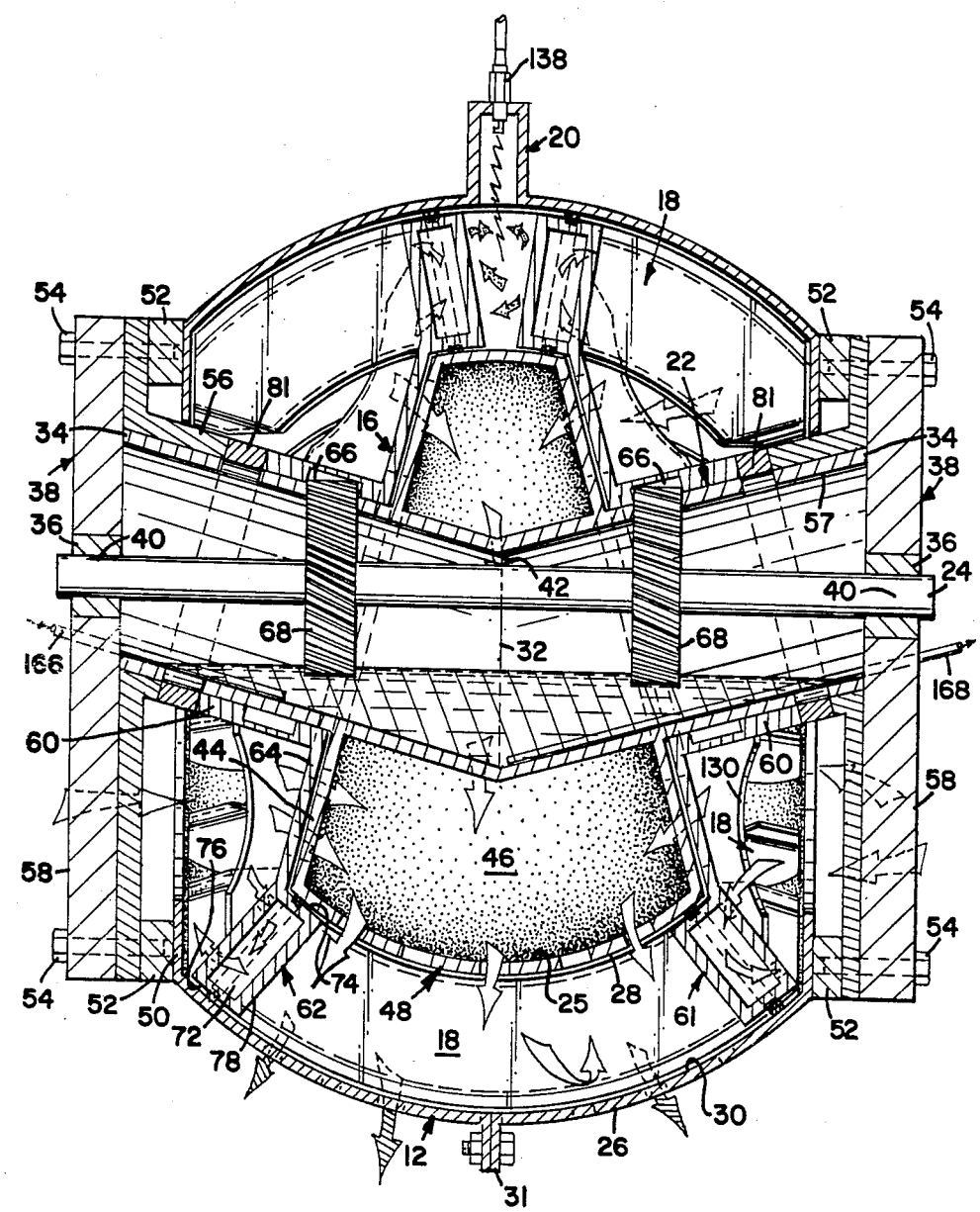
FIG. 3 is a cross-sectional view taken along line 3—3 of FIG. 1.

As shown in FIG. 3, frame 12 includes inner and outer members 25 and 26 which form portions of inner and outer concentric spherical surfaces 28 and 30, respectively. Surfaces 28 and 30 are spaced-apart and are endless in that portions extend completely around the center of the sphere. Frame 12 also includes shaft 22 which is nonrotatable and angled at vertex plane 32. The center of shaft 22 at vertex plane 32 is also the center of spherical surfaces 28 and 30. Legs 34 of shaft 22 extend in opposite directions from vertex plane 32 and are angled equally with respect to the vertex plane 32. The angle chosen influences the compression ratio of the engine. The spacing between the cross vanes 18, between the sidewalls 61 of rotors 16 and between spherical surfaces 28 and 30 also influences the compression ratio.

Shaft 22 is hollow and has a diameter and angle which allows power shaft 24 to be a straight, solid shaft which extends completely through shaft 22 between bearings 36 in opposite end members 38. That is, shaft 22 must have sufficient diameter considering its angle so that shaft 24 does not interfere with shaft 22 at either of the ends 40 of shaft 22 or at the center 42 where shaft 24 passes through vertex plane 32. A ring-shaped wall 44 extends radially from each leg 34 of shaft 22 to member 25. Since shaft 22 is angled, walls 44 are also angled with respect to one another. Member 25 ends at walls 44. Thus, member 25, shaft 22 and walls 44 form an integral assembly 48 and enclose air chamber 46 between walls 44 and between shaft 22 and member 25. Air chamber 46 thus has a spherical wall with nonparallel ends and has shaft 22 extending through. It is understood that there may be welds or other fastening joints necessary to form shaft 22, member 25 and walls 44 into assembly 48.

Outer member 30 is attached to assembly 48 to complete frame 12. Member 30 has a spherical shape with opposite ends truncated along parallel chord planes. Member 30, as shown, may be formed from a mirror-image pair of half members which are bolted together or otherwise fastened at flanges 31 which are located midway between the ends of member 30. It is understood that member 30 could as well be a single, unified part. A flange 50 extends inwardly at each of the opposite ends of member 30. Rings 52 are welded or otherwise attached to flanges 50 and include threaded openings regularly spaced thereabout. Each end member 38 is fastened with a plurality of screws 54 to a ring 52. Each end member 54 includes a portion 56 which fits snugly about shaft 22 near an end 57. In this way, member 30 is securely held with respect to member 25 and aligned so as to form an evenly spaced region through which cross vanes 18 rotate. Each end member 38 is sealed with respect to shaft 22 so that shaft 22 may function as a reservoir for lubricant as discussed hereinafter. Each end member 38 includes large open regions 58 through which air may pass as also discussed further hereinafter.

A rotor 16 is installed to rotate on each leg 34 of shaft 22. Rotor 16 includes a hub 60, a thickened annular wall 61 in the form of a plurality of hollow wall segments 62, and a connecting ring 64 connecting the hub 60 and wall segments 62 together. Hub 60 is cylindrical so as to fit about a leg 34 of shaft 22. A portion of the inner surface of hub 60 is formed to be a ring gear 66 for driving a mating gear 68 fastened on power shaft 24. Gears 66 and 68 mesh at only a portion of the periphery of each since hub 60 is inclined with respect to gear 68 in a fashion similar to the relative angle between shafts 22 and 24. A slotted opening is formed in each leg 34 of shaft 22 to allow gear 68 to protrude through shaft 22 and mate with gear 66 on the inside of hub 60.

Each connecting ring 64 is radial with respect to a leg 34 of shaft 22 and is adjacent to one of the ring-shaped walls 44.

As indicated, wall segments 62 form essentially a thickened annular wall 61 with transverse slots at the outer periphery of connecting ring 64. Wall segments 62 are separated from one another at the slots by a cross vane 18 and first sealing mechanisms 70 which fit between each wall segment 62 and cross vane 18 as described hereinafter. Each wall segment 62 is hollow and forms an enclosed space 72. In this regard, a wall segment 62 includes spaced-apart inner and outer walls 74 and 76 with fore and aft walls 78 and arcuate end walls 80 (see FIG. 6). The center plane of the plurality of wall segments 62 considered together as annular wall 61 form essentially an imaginary frusto-conical surface which if extended would have an apex at the center of spherical surfaces 28 and 30.

Spacers 81 are used between hub 60 and end member 38 as required to hold rotor 16 adjacent to ring-shaped wall 44. It is understood that spacer 81 may also serve a seating function.

Cross vanes 18 fit between a consecutive pair of wall segments 62 in a slot defined by opposing sides of pivot blocks 82 of sealing mechanisms 70. Cross vanes 18 extend from flange 50 and through wall segment 62 of one rotor 16 and through wall segments 62 of the other rotor 16 to the opposite flange 50 at all locations as the rotors are rotated. Cross vanes 18 are thus retained with respect to transverse movement by flanges 50. It is noted that the rotors 16 have a nearest approach to one another at one location and are fartherest apart from one another at a location directly opposite the location of nearest approach. Cross vanes 18 slide with respect to the rotors as the rotors rotate between the various locations.

Cross vanes 18 are hollow and are preferably flat in directions parallel to the axis of rotation. Cross vanes 18 have second sealing mechanisms 83 (see FIG. 7) at inner and outer edges which are arcuate to conform to surfaces 28 and 30 at all locations as cross vanes 18 rotate around surfaces 28 and 30.

Figure 5:
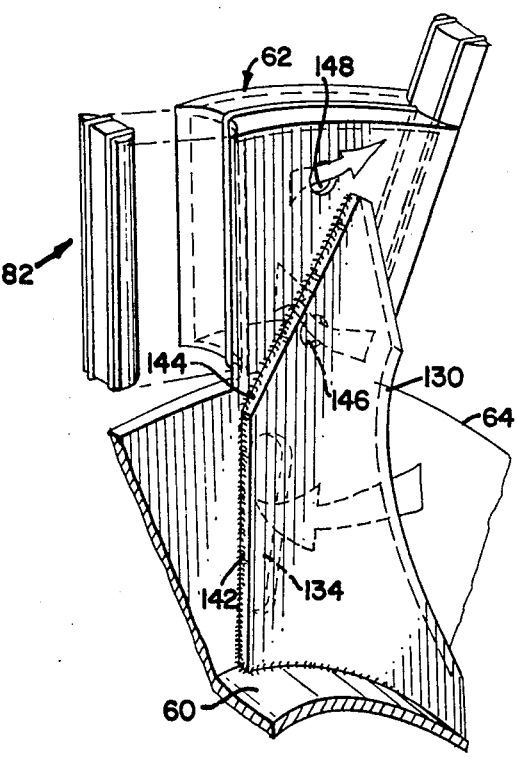
FIG. 5 is a partially exploded view of a portion of a rotor, including the annular wall with the pivot seal mechanisms and an air deflector member.
Figure 2:
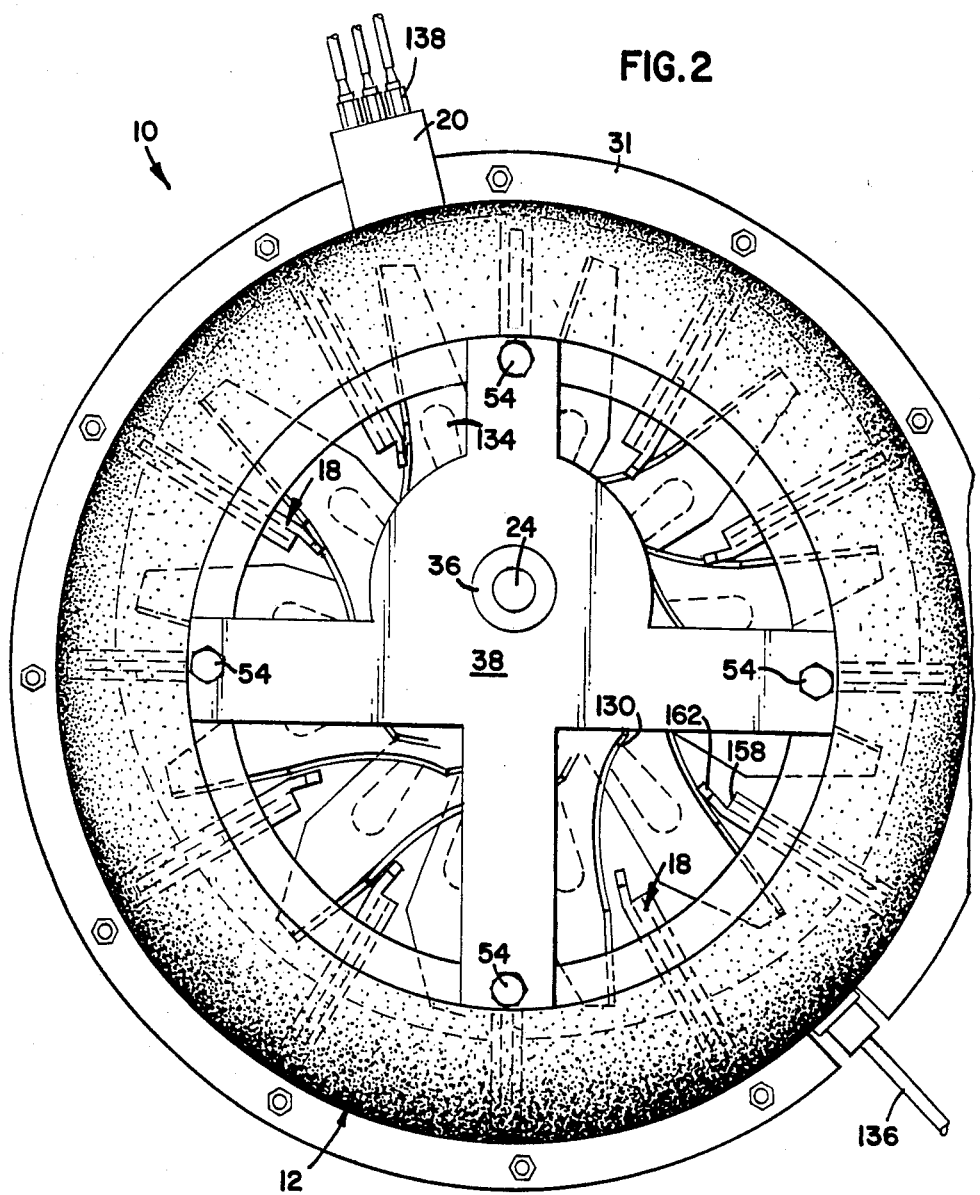
FIG. 2 is an end view.
Figure 6:
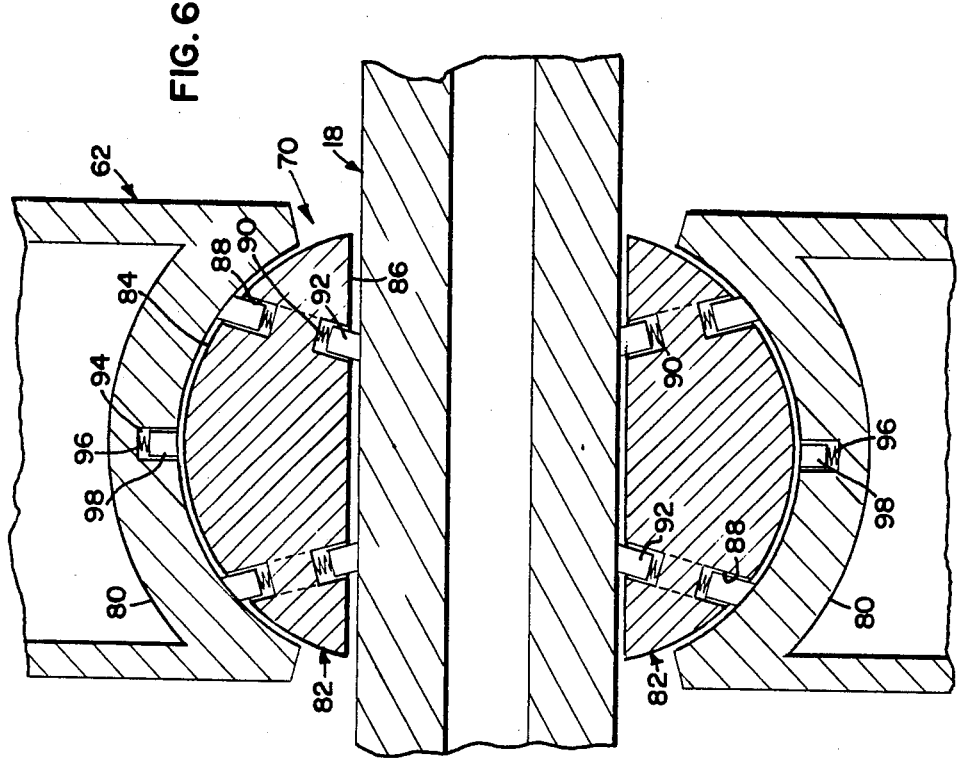
FIG. 6 is a cross-sectional view showing seal mechanisms on opposite sides of a cross vane at ends of consecutive annular wall segments of a rotor.

An appropriate first sealing mechanism 70 for sealing wall segments 62 dynamically with respect to a cross vane 18 is shown in FIG. 6. As indicated previously, end wall 80 of wall segment 62 has an arcuate shape in order to receive pivot block 82. As shown more clearly in FIG. 5, pivot block 82 extends along wall segment 62 for the height of wall segment 62. That is, pivot block 82 extends between surfaces 28 and 30 just as wall segment 62 does. Pivot block 82 has an arcuate side 84 to mate with wall 80 and a straight side 86 to mate with cross vane 18. Pivot block 82 includes near each of the mating edges of sides 84 and 86 a groove 88 in each of sides 84 and 86 and each of the ends of pivot block 82. That is, groove 88 is endless. The sealing mechanism in groove 88 is preferably a type having a spring 90 and a seal element 92 of a type which can be shaped to seal against the appropriate surface and, at the same time, which can withstand the dynamic movement which is present as pivot block 82 pivots and as cross vane 18 slides. In this way, seal element 92 forms a seal between end wall 80 of wall segment 62 and cross vane 18.

In a similar fashion, a groove 94 is formed to be centered on a radial plane around wall segment 62. A similar spring 96 and seal element 98 as spring 90 and seal element 92 are installed in groove 94 to seal primarily between wall segment 62 and surface 28 and between wall segment 62 and surface 30, such sealing being dynamic as rotors 16 rotate with respect to surfaces 28 and 30. Secondarily, seal element 98 also seals between wall segment 62 and pivot block 82. Elements such as pivot block 82 provide the advantage that as rotor 16 rotates and cross vane 18 slides with respect to rotor 16 so that the inclination angle of rotor 16 with respect to cross vane 18 changes, pivot block 82 can pivot to maintain a mating relationship between the wall segment 62 and cross vane 18 and, of more importance, to maintain a seal therebetween.

Figure 7:
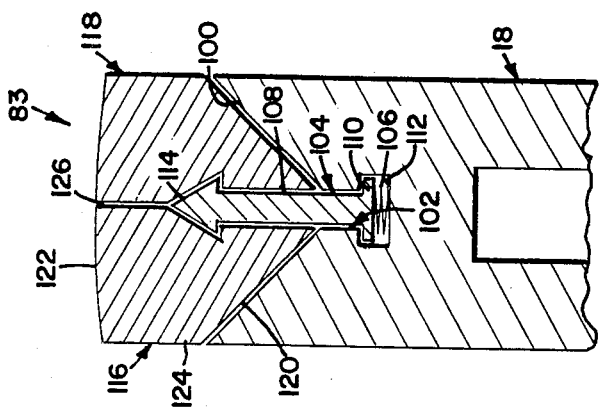
FIG. 7 is a cross-sectional view of an edge sealing mechanism of a cross vane.

An appropriate second sealing mechanism 83 for sealing the inner and outer edges of each cross vane dynamically with respect to inner and outer surfaces 28 and 30 is shown in FIG. 7. The sealing mechanism 83 shown in FIG. 7 pertains to an outer edge. It is understood, however, that the inner edge second sealing mechanism is similar. Cross vane 18 is formed to have a V-shaped groove 100 with a headed slot 102 at the apex. A seal expander 104 fits in and is retained in slot 102 and is biased outwardly from slot 102 by a spring 106. Seal expander 104 has a plate-like body 108 with a wider head 110 along its inner end to fit within the wider head portion 112 of slot 102. The outer end 114 of seal expander 104 has a triangular shape with the apex outwardly and the base connected to and wider than body 108. Seal expander 104 has length so as to extend between the opposite ends of cross vane 18. Seal expander 104 may be straight from end to end or may be shaped arcuately to correspond with spherical surfaces 28 and 30.

Seal elements 116 and 118 become the outer edge of cross vane 18. Seal element 116, fits on one side and seal element 118 on the other. Seal element 16, for example, has a wedge-shaped inner end 120 to fit between one side of the V-shaped groove 100 and seal expander 104. The outer side 122 of seal element 116 has a spherical shape to conform with outer surface 30 of frame 12. An outer side 124 extending between outer edge 122 and inner wedge 120 is straight. Inner side 126 conforms to the shape of seal expander 104, to the apex of triangular head 114 and then is flat and mates with the other seal element 118. Seal element 118 is a mirror image of element 116.

The indicated shapes of cross vane 18, seal expander 104 and seal elements 116 and 118 function in combination with spring 106 to keep outer edges 122 against surface 30 of frame 12. The mating edge of wedge 120 may be spaced somewhat from a side of V-shape groove 100 for each of elements 116 and 118 as seal expander 104 is biased outwardly pressing sides of triangular head 114 against mating surfaces of inner sides 126.

It is understood that first and second seal mechanisms 70 and 83 are conceptual and that appropriate materials, tolerances, greases etc., may also be specified in a fashion known to those skilled in the art.

As indicated previously, a combustion chamber 14 is formed between consecutive cross vanes 18 and opposite wall segments 62, as well as between surfaces 28 and 30 of frame members 25 and 26. Each combustion chamber is sealed between each cross vane 18 and wall segment 62 by a first sealing mechanism 70. Seal element 98 provides a seal from one cross vane 18 to the next between wall segments 62 and surface 28 and also between wall segment 62 and surface 30. Second sealing mechanism 83 completes the sealing of a combustion chamber 14 by providing a seal between cross vane 18 and outer surface 30, as well as between cross vane 18 and inner surface 28.

Figure 4:
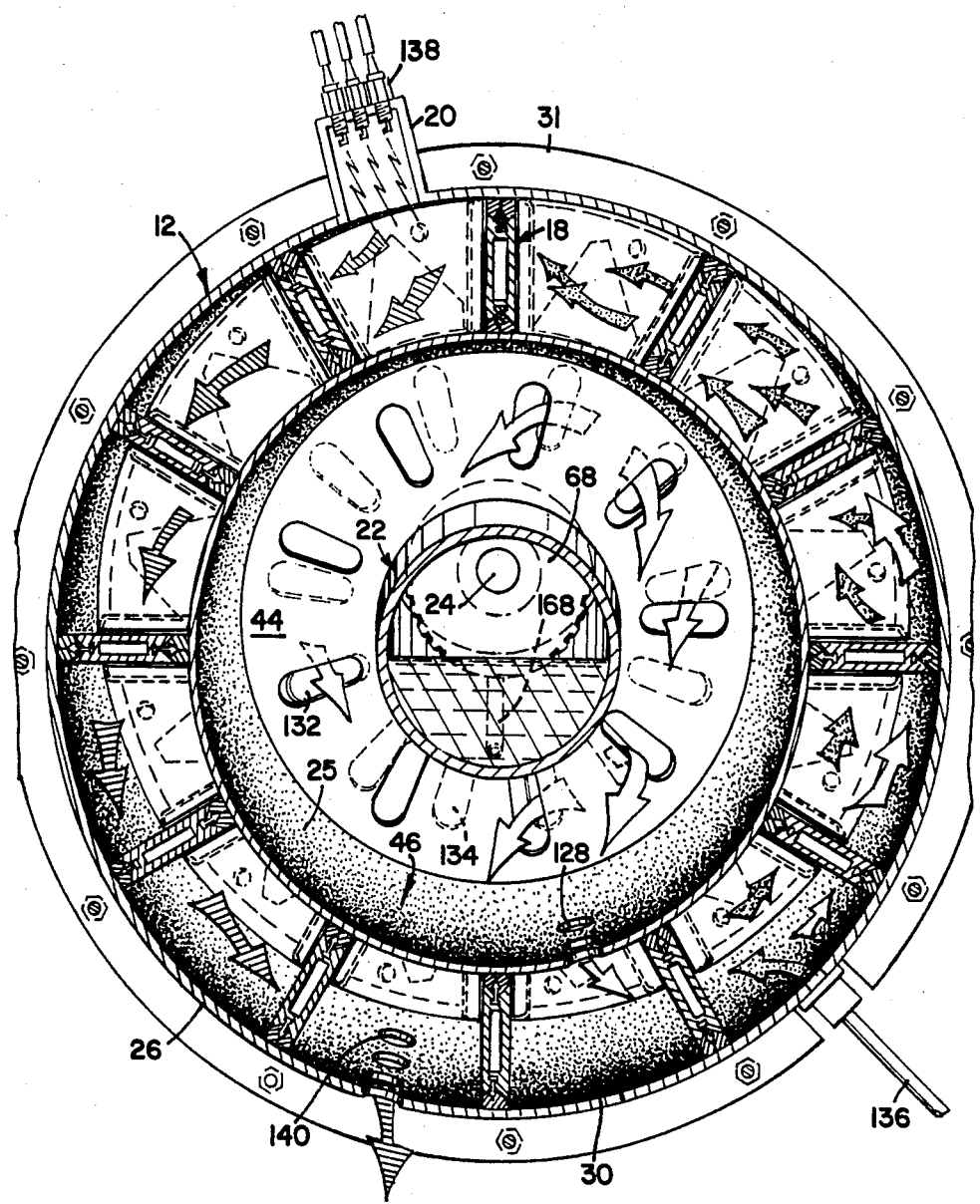
FIG. 4 is a cross-sectional view taken along line 4—4 of FIG. 1.

Combustion chambers 14 rotate around air chamber 46 in repetitive and consecutive compression and expansion cycles. Once the rotor and cross vane assembly are started rotating by a starting system which is not shown in the present application, but could be achieved by initially rotating power shaft 24 with an external gear mechanism and a powered starter motor, the ignition of air-fuel mixtures sustains the operation of the engine 10. In this regard, a plurality of first openings 128 (see FIG. 4) lead from air chamber 46 into one of combustion chambers 14 as the one combustion chamber 14 rotates past the series of first openings 128. As indicated previously, air passes through the large open regions 58 in end members 54 of frame 12, and then is drawn by air scoops 130 (see FIGS. 3 and 5) through second openings 132 in ring-shaped walls 44 and third openings 134 in connecting rings 64 of rotors 16. Preferably, there is a different number of regularly spaced second openings 132 as regularly spaced third openings 134 to reduce noise.

As the particular combustion chamber 18 proceeds from the location where it is approximately its largest and receives air from air chamber 46, it passes fuel inlet 136 so that a desired air-fuel mixture is created in the combustion chamber. Since rotors 16 are angled with respect to one another as a result of rotating about angled shaft 22, wall segments 62 at the periphery of rotors 16 rotate from locations where they are spaced farthest from one another to locations where they are spaced nearest one another. As this occurs, first sealing mechanisms 70 slide along cross vanes 18 to change the volume of a combustion chamber 14. At approximately the location where a combustion chamber has its smallest volume, an ignition mechanism, as illustrated with a spark plug 138, fires to ignite the air-fuel mixture. In this regard, it is understood that fuel inlet 136 and the ignition system having spark plugs 136 are representative of such systems and a fuel injection system or diesel system or some other such fuel providing and ignition systems are equally applicable and equivalent for use with the present engine 10.

Figure 9:
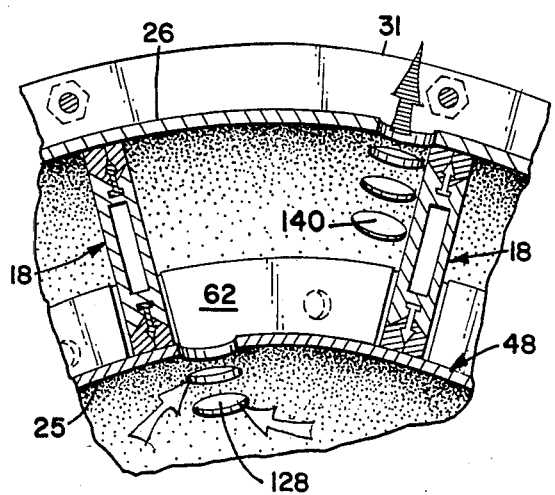
FIG. 9 is a partial view similar to FIG. 4 showing the cross vanes rotated so that the inlet and exhaust openings open into the same combustion chamber.

When the air-fuel mixture fires, pressurized combustion products are created which function to try to expand the volume of the combustion chamber 14. Thus, rotors 16 are forced to rotate and allow the combustion chamber 14 to expand. As the combustion chamber nears the location where it has its largest volume, fourth openings 140 in outer member 26 allow the combustion products to exhaust. It is noted that in some cases it is desirable to locate first and fourth openings 128 and 140 such that as a combustion chamber 14 is rotated, fourth openings 140 are near one cross vane 18 while first openings 128 are near another cross vane 18 (see FIG. 9). In this way, incoming air helps force combustion products from the chamber.

Rotors 16 include a deflector member 130 for each wall segment 62. Deflector member 130 is angled with respect to connecting ring 64 of rotor 16 and extends from hub 60 to wall segment 62 (see FIG. 5). Deflector members 130 are located so that the attachment edge 142 of deflector member 130 to connecting ring 64 is spaced only a short distance downstream from one of said third openings 134 in connecting ring 64. In addition, attachment edge 144 of deflector member 130 where it is welded or otherwise attached to wall segment 62 is spaced only a short distance downstream from inlet opening 146 leading to the hollow portion of wall segment 62 and is spaced somewhat upstream from outlet opening 148. That is, deflector member 130 is essentially between inlet and outlet openings 146 and 148. Deflector member 130 is angled with respect to rotor 16 so that as rotor 16 rotates, incoming air is received between deflector member 130 and rotor 16 and deflected or forced into openings 134 and 146. As discussed hereinbefore, air directed through a third opening 134 is also directed through a second opening 132 as opening 134 moves into alignment with opening 132. The air then enters and pressurizes air chamber 46 and is available for supercharging combustion chambers 14. In addition, the central portion of engine 10 is cooled by the air thusly directed.

Wall segments 62 are air cooled. As indicated, air is directed by deflector member 130 to inlet opening 146. Air passes therethrough into the hollow portion of wall segment 62 and then out again from outlet opening 148 on the downstream side of deflector member 130.

Figure 8:
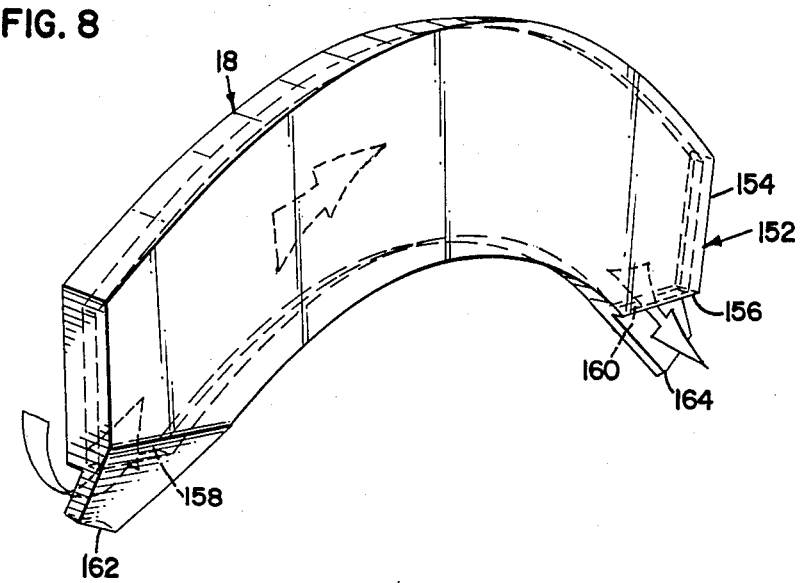
FIG. 8 is a perspective view of a cross vane showing an air flow path for cooling the vane.

Each cross vane 18 is also air cooled. A cross vane 18 without second sealing mechanisms 83 is shown in FIG. 8. End edges 152 form a right angle. End edges 152 include vertical portions 154 parallel with flanges 50 extending from the outer edge and horizontal portions 156 extending between vertical portion 154 and the inner edge, which has a length from end to end approximately the same as the greatest width of spherical surface 28. Horizontal portion 156 includes an inlet opening 158 at one end leading to the hollow portion of cross vane 18 and an outlet opening 160 at the other end. Cross vane 18 also includes an air scoop member 162 which extends downwardly and forwardly from the back or downstream wall of cross vane 18 at horizontal portion 156. Air scoop member 162 thus deflects air into inlet opening 158 and the hollow portion of cross vane 18. On the other side of cross vane 18, a similar air scoop deflector 164 is located on the opposite wall and extends downwardly and is inclined in the opposite direction as scoop member 162. In this way, air scoop member 164 deflects air exhausting from outlet opening 156 away from cross vane 18 as cross vane 18 rotates. Likewise, as cross vane 18 rotates, air scoop member 164 deflects oncoming air downwardly and tends to develop a low pressure region to draw exhausting air from the hollow portion of cross vane 18.

Thus, the interior of engine 10 is cooled by the air which is forced into air chamber 46 and used as combustion air. In addition, air is deflected and forced into the hollow portions of wall segments 62 and cross vanes 18 to cool the walls of the combustion chambers.

With respect to lubrication, bearings 36 are preferably of a self-sealing type and do not need external lubrication. Hubs 60 may include a grease fitting and be periodically greased, or, as shown in FIG. 3, shaft 22 may be used as an oil reservoir filled to a level whereby gears 68 run in oil and continuously lubricate hubs 60 with respect to shaft 22. Input and output lines 166 and 168 lead from and to a pump mechanism (not shown). With respect to combustion chambers 14, lubrication for cross vanes 18 and wall segment 62 may be provided with an appropriate oil mixed with the fuel.

In use, power shaft 24 is rotated by a starting system (not shown). Gears 68 mesh with planetary gears 66 which are a part of hubs 60 of rotors 16 to drive rotors 16 in rotation. Shortly thereafter, the ignition system, represented by spark plugs 138, begins to fire. At the same time, as rotors 16 rotate, combustion chambers 14 begin to move through compression and expansion cycles. At the beginning of a compression cycle, combustion air which has been forced into air chamber 46 by deflector members 130 deflecting air through second and third openings 132 and 134, expands through first openings 128 into the combustion chamber just outwardly from openings 128. As that combustion chamber continues to be rotated, fuel is input from a fuel system having an inlet line represented by numeral 136. As the combustion chamber continues to rotate, its volume is decreased and the air-fuel mixture is compressed. Near the location where the combustion chamber has its least volume, the ignition system fires and explodes the air-fuel mixture to create pressurized combustion products. The high pressure causes the combustion chamber to move in a direction which allows its volume to expand. When the combustion chamber gets near its largest volume, combustion products are exhausted from fourth openings 140. Preferably, first and fourth openings 128 and 140 are located so that new combustion air from first openings 128 is beginning to flow into the combustion chamber as the last remnants of combustion products are being forced from the combustion chamber.

Each combustion chamber is formed by consecutive cross vanes 18 and opposite wall segments 62 on rotors 16. The inner and outer walls of a combustion chamber are formed by the spherical surfaces 28 and 30 of inner and outer members 25 and 26. Outer member 26 may be adequately cooled with air exterior of engine 10. Inner member 25 is cooled by the continual flow of outside air into the interior air chamber 46. In this regard, as rotors 16 rotate, deflectors 130 deflect air into second and third openings 132 and 134 to air chamber 46.

Similarly, wall segments 62 and cross vanes 18 are air cooled. Air is deflected by deflector members 130 into inlet openings 146 of wall segments 62 on one side of deflector members 130 and is then forced out of outlet openings 148 on the downstream side of deflectors 130.

With respect to cross vanes 18, air scoop members 162 direct air upwardly into inlet openings 158 to pass through the hollow cross vane and be exhausted from outlet openings 160. Exhaust air is then directed away from and to a certain degree drawn by low pressure region created by reversely inclined air scoop member 164.

The combustion chambers 14 are sealed with first and second sealing mechanisms 70 and 83. Pivot blocks 82 of first sealing mechanisms 70 rotate at the cylindrical interfaces between pivot blocks 82 and walls 80 of wall segment 62. In this way, the flat sides 86 of pivot blocks 82 always stay flat with respect to cross vanes 18 as cross vanes 18 slide in the slot between a pair of facing pivot blocks 82 of consecutive wall segments 62. Springs 90 bias seal elements 92 against walls 80 and against cross vanes 18.

A seal element 98 is biased by a spring 96 outwardly from a slot 94 in the longitudinal dimension of each wall segment 62 in order to seal between wall segments 62 and inner and outer surfaces 28 and 30 of frame members 25 and 26.

Second sealing mechanisms 83 seal between cross vanes 18 and inner and outer spherical surfaces 28 and 30. An expander member 104 is biased outwardly by a spring 106 to force elements 116 and 118 outwardly against one of the spherical surfaces 28 and 30. As elements 116 and 118 wear, expander 104 continues to press them against the appropriate spherical surface.

The wedge shaped groove 100 and the triangular shaped head 114 of the expander member cooperate to retain elements 116 and 118 in place and function as indicated.

Thus, the present engine 10 is representative of a simple, rotary design for an engine which achieves a high power to weight ratio. A preferred embodiment has been disclosed in detail and advantages of structure and function discussed. It is understood, however, that the preferred embodiment is exemplary and that equivalents are available. Therefore, it is understood that changes made, especially in matters of shape, size, arrangement of elements and substitution of equivalent elements, to the full extent extended by the general meaning of the terms in which the appended claims are expressed, are within the principle of the present invention.

What is claimed is:

1. An engine, comprising:
   a frame including members forming portions of inner and outer concentric spherical surfaces and a hollow shaft, said frame also including first means for supporting said members with respect to said hollow shaft, said hollow shaft passing through space encircled by said spherical surfaces;
   a rotatable drive shaft extending through said hollow shaft;
   second means for rotatably supporting said drive shaft with respect to said hollow shaft;
   means for forming a variable volume combustion chamber between said spherical surfaces;
   third means for rotatably supporting said chamber forming means on said hollow shaft, said third supporting means including means for driving said drive shaft;
   first means for charging said combustion chamber with air;
   second means for charging said combustion chamber with fuel to create an air-fuel mixture;
   means for igniting said air-fuel mixture to create combustion products;
   means for exhausting combustion products from said combustion chamber; and
   means for cooling said engine.

2. The engine in accordance with claim 1 wherein said hollow shaft is shaped to include an angle having legs on opposite sides of a vertex plane, said hollow shaft having a centerpoint in said vertex plane, said centerpoint also being the center of said inner and outer spherical surfaces.

3. The engine in accordance with claim 2, wherein said chamber forming means includes a pair of rotors, a different one of said pair being rotatable on a different leg of said hollow shaft, each of said rotors including a hub, a plurality of hollow wall segments and a connecting ring between said hub and said wall segments, said chamber forming means further including a plurality of cross vanes movably extending between opposite said wall segments of said rotors and also extending slidably between said inner and outer spherical surfaces to form combustion chambers.

4. An engine in accordance with claim 3 wherein said combustion chamber forming means include first means for sealing said hollow wall segments with respect to consecutive cross vanes and said inner and outer spherical surfaces.

5. The engine in accordance with claim 4 wherein said combustion chamber forming means include second means for dynamically sealing each of said cross vanes with respect to said inner and outer spherical surfaces.

6. The engine in accordance with claim 3 wherein said driving means for said drive shaft includes a first gear means attached to said drive shaft and second gear means for driving said first gear means, said second gear means being attached to one of said hubs of one of said rotors.

7. The engine in accordance with claim 3 wherein said first supporting means includes a pair of ring-shaped walls, each ring-shaped wall extending radially from a different leg of said hollow shaft to said member forming said inner spherical surface, said hollow shaft and said ring-shaped walls enclosing an air chamber.

8. The engine in accordance with claim 7 wherein said air charging means includes a first opening in said member forming said inner spherical surface, said first opening leading from said air chamber into one of said combustion chambers as said one combustion chamber rotates past said first opening.

9. The engine in accordance with claim 8 wherein said air charging means also includes a plurality of second openings in at least one of said ring-shaped walls of said air chamber, said air charging means further including a plurality of third openings in said connecting ring of said rotor which is adjacent to said ring-shaped wall with said second openings, said plurality of second openings being a number different from said plurality of third openings to avoid synchronizing said second and third openings and to minimize any resultant noise.

10. The engine in accordance with claim 9 wherein said rotor having said plurality of third openings includes a plurality of deflector members for directing air into said third openings.

11. The engine in accordance with claim 8 wherein said exhausting means includes a fourth opening in said member forming said outer spherical surface, said first and fourth openings being located to open into one of said combustion chambers at the same time, said fourth opening being located to exhaust at least some of said combustion products from said one combustion chamber before said first opening allows air into said one combustion chamber.

12. The engine in accordance with claim 3 wherein said hollow wall segments of said rotors have inner walls forming sides for said combustion chambers and outer walls, said cooling means including inlet and outlet openings in said outer walls, whereby air flows through said hollow wall segments to cool said segments.

13. The engine in accordance with claim 12 wherein said cooling means further includes a deflector member on the outer wall of each hollow wall segment, said deflector member being between said inlet and outlet openings.

14. The engine in accordance with claim 3 wherein said cross vane is hollow and includes inlet and outlet openings near opposite ends, respectively, said cross vane also including air scoop members at said opposite ends, one of said air scoops being inclined with respect to said cross vane to deflect air into said inlet opening as said cross vane moves and the other of said air scoop being inclined to deflect air away from said outlet opening to aid in exhausting air from said hollow cross vane as said cross vane moves.

15. An engine, comprising:

a frame including inner and outer members forming a pair of spaced-apart endless surfaces, said frame also including an angled, nonrotatable shaft and means for supporting said nonrotatable shaft with respect to said inner member, said angled, nonrotatable shaft having first and second legs;

a drive shaft and means for rotatably supporting said drive shaft within said nonrotatable shaft;

a pair of rotors with hubs and an annular wall, said rotors including means for connecting said annular wall and said hub, one of said rotors being rotatably fitted on said first leg of said nonrotatable shaft and the other rotor being rotatably fitted on said second leg, said rotors further including means for driving said drive shaft;

a plurality of cross vanes fitting between said annular walls of said rotors and between spaced-apart endless surfaces of said inner and outer members of said frame thereby forming a plurality of combustion chambers;

means for slideably retaining said cross vanes with respect to said annular walls of said rotors;

means for sealing said combustion chambers;

first means for charging said combustion chambers with air;

second means for charging said combustion chambers with fuel to create an air-fuel mixture;

means for selectively igniting said air-fuel mixture in said combustion chambers to create pressurized combustion products, said pressurized combustion products forcing said combustion chambers to expand thereby causing said cross vanes to rotate said rotors, said rotating vanes causing said driving means to power said drive shaft;

means for exhausting said combustion products from said combustion chambers; and means for cooling said engine.

16. The engine in accordance with claim 15 wherein said retaining means includes slots in said annular walls of said rotors, and wherein said frame includes stop members for preventing said cross vanes from sliding transversely out of said slots.

17. The engine in accordance with claim 16 wherein said sealing means includes a pivot member on each side of each of said slots, each of said pivot members being between one of said annular walls and one of said cross vanes, said sealing means further including a plurality of seal members for sealing between said pivot member and said annular wall and between said pivot member and said cross vane.

18. The engine in accordance with claim 15 wherein said cooling means includes an air chamber between said inner member of said frame and said nonrotatable shaft, said frame including first and second ring-shaped walls extending radially from said first and second legs, respectively, to said inner member to enclose said air chamber between said inner member and said nonrotatable shaft, said air charging means including a first opening in said inner member, said first opening leading from said air chamber into one of said combustion chambers as said one of said combustion chambers rotates past said first opening, said air charging means further including a plurality of second openings in at least one of said ring-shaped walls and a plurality of third openings in said connecting means of said rotor adjacent said ring-shaped wall with said second openings therein, said exhausting means including a fourth opening in said outer member to exhaust combustion products from said combustion chamber as air flows through said first opening to charge said combustion chamber, whereby said air flowing through said plurality of second and third openings into said air chamber and charging said combustion chamber through said first opening and exhausting said combustion chamber through said fourth opening functions to cool said engine in a region interior of said inner member of said frame.

19. The engine in accordance with claim 18 wherein said cooling means further includes said annular walls of said rotors formed into a plurality of hollow wall segments with at least one segment between each set of consecutive cross vanes, said hollow wall segments having inner walls forming sides for said combustion chambers and outer walls opposite to said inner walls, said cooling means including inlet and outlet openings in said outer walls whereby air flows through said inlet and outlet openings and said hollow wall segments to cool said segments.

20. The engine in accordance with claim 19 wherein each of said cross vanes is hollow and includes inlet and outlet openings near opposite ends thereof, whereby air flows in said cross vane inlet opening at one end and out said cross vane outlet opening at another end to cool said cross vanes.

* * * * *